United States Patent [19]
Kin-Shon

[11] Patent Number: 4,766,999
[45] Date of Patent: Aug. 30, 1988

[54] LIBRARY CASE FOR THE DISKETTES

[76] Inventor: Lu Kin-Shon, No. 156, Si-Ning S. Road, Taipei, Taiwan

[21] Appl. No.: 61,103

[22] Filed: Jun. 12, 1987

[30] Foreign Application Priority Data

May 15, 1987 [TW] Taiwan .............................. 76204450

[51] Int. Cl.⁴ .............................................. B65D 85/57
[52] U.S. Cl. ................... 206/45.13; 206/45.18; 206/444; 220/333
[58] Field of Search .................. 16/362, 363, 365, 375; 206/45.13, 45.15, 45.18, 45.23, 387, 425, 444, 472, 449; 220/23, 255, 329, 331, 333, 334, 340, 342

[56] References Cited

U.S. PATENT DOCUMENTS

| | | | |
|---|---|---|---|
| 4,325,595 | 4/1982 | Solomon | 206/45.13 |
| 4,478,335 | 10/1984 | Long et al. | 206/45.23 |
| 4,479,577 | 10/1984 | Eichner et al. | 220/23 |
| 4,508,217 | 4/1985 | Long et al. | 206/425 |
| 4,541,527 | 9/1985 | Nagel | 206/425 |
| 4,546,898 | 10/1985 | Ekuan | 206/444 |
| 4,586,603 | 5/1986 | Long et al. | 206/444 |
| 4,615,445 | 10/1986 | Stocchiero | 206/444 |
| 4,634,001 | 1/1987 | Wakelin | 206/444 |
| 4,676,375 | 6/1987 | Willems et al. | 206/444 |

FOREIGN PATENT DOCUMENTS

| | | | |
|---|---|---|---|
| 0177415 | 4/1986 | European Pat. Off. | 206/444 |
| 0001150 | of 1903 | United Kingdom | 220/333 |

Primary Examiner—Jimmy G. Foster
Attorney, Agent, or Firm—Mason, Fenwick & Lawrence

[57] ABSTRACT

A novel library case for diskettes is disclosed. The case comprises a lid, a base having a longitudinal length slightly smaller than half the length of the lid and being provided with at least one stop means, and a support disposed at rear portion of the base with a longitudinal length complementary constituting the difference between the lengthes of the lid and the base and being formed with at least one snap notch along lateral rim, in such a construction that when the lid is lifted up with respect to the base for about 90° to 120° degrees, the stop means will engage with the snap notch to be securely fixed to present the open position and the support is synchronously moved with respect to the lid in forward inclination of about 45 degrees for setting up the diskettes contained in the case.

8 Claims, 3 Drawing Sheets

PRIOR ART

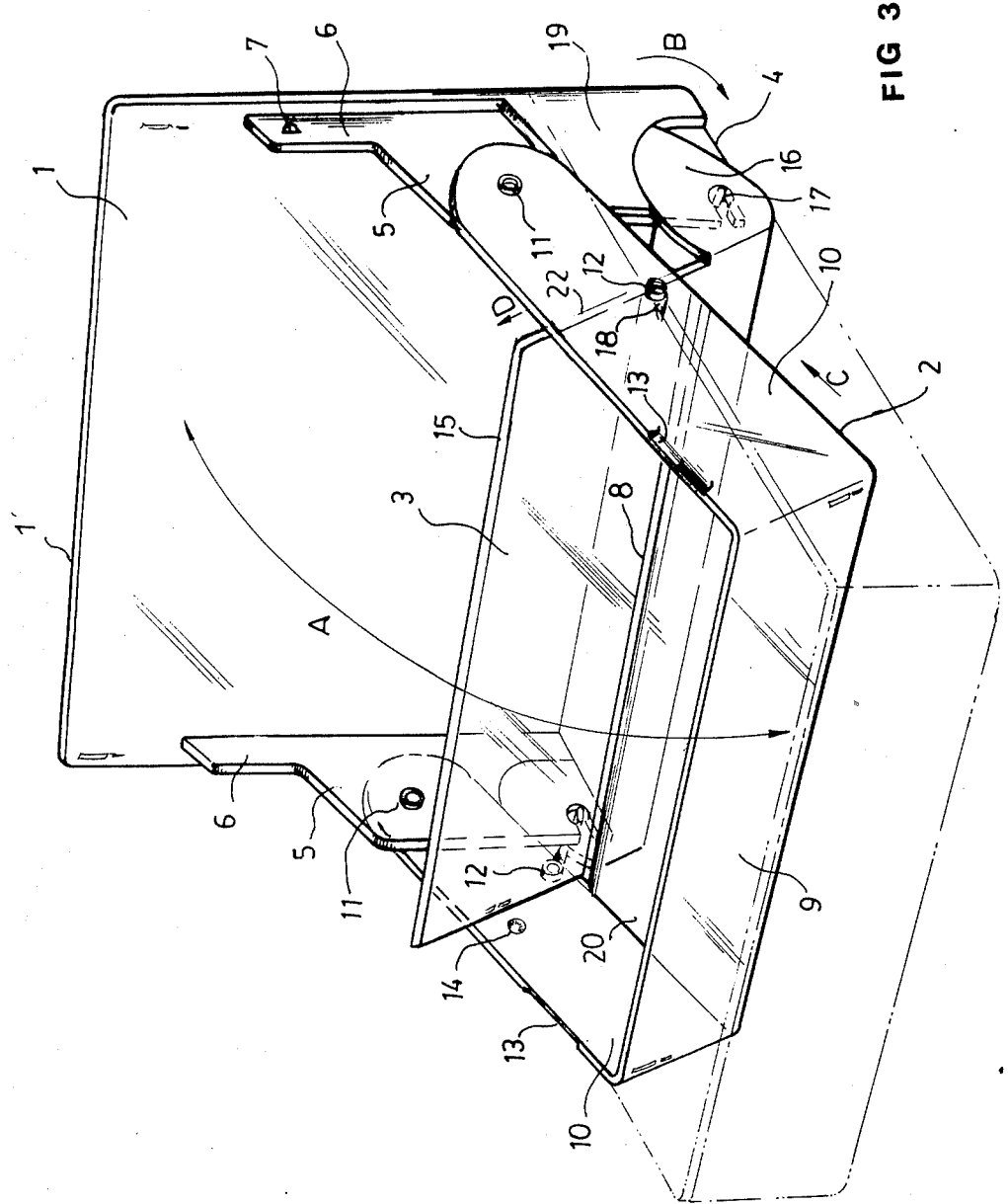

LIBRARY CASE FOR THE DISKETTES

This application relates to a novel library case for the diskettes.

There are various kinds of library cases for the diskettes available in the market. The most popular one is shown in FIG. 1 which, as illustrated, comprises the lid a, the base b and the support c. The lid a has walls only at its lateral sides. These walls extend forwardly from the rear end of the lid to about two thirds of the length of the lid. The base b has walls at its front and both lateral sides with the latter pivotally connected at the rear ends with the corresponding rear ends of the lateral walls of the lid. The base b is formed with a gap by the difference of its logitudinal length shorter than the lateral sides. The support c has walls at its rear and at both lateral sides, said rear side is also used as the rear side of the case and said both lateral sides are formed with a notch fitted around an extension of the pivot that engages the lateral side of the base and the corresponding lateral side of the lid. This is disadvantageous in that in operation of opening or closing the case, the lid must be in a pivotal movement between the open position as shown in solid line and the closed position as shown in two-dot-and-dash line for about 315 degrees, as illustrated by the double head arrow in arc. Meanwhile, the support c is retained within the lateral sides of the lid a as shown in two-dot-and-dash line, which can only be pivotally moved outwards by fingers in a direction illustrated by the arrow to a certain inclination for readily accessing the diskette d. Moreover, the length of the support c is too short such that the support area for the diskette is insufficient, and the whole case is unstable during setting up since the support is rendered a great force from the diskettes.

The object of this invention is to provide a novel library case for diskettes, wherein the case is brought to open position as soon as the lid pivotally moves 90 to 120 degrees with respect to the base. The support has an area 2.5 times greater than that of the conventional case and synchronously moves to incline forward about 45 degrees with respect to the lid, such that an optimal supporting position is presented for effective and positive operation.

This object is accomplished by the novel library case for the diskettes according to the present invention, which comprises a lid having downwardly extending walls at its rear side and both lateral sides; a base having a base panel of longitudinal length slightly less than half the length of said lid and having a rear edge, and upwardly extending walls at its front side and both lateral sides, the latter lateral sides being longer than said base itself and pivotally connecting at its free ends to a correspondingly suitable location on lateral side walls of said lid, at least one of said lateral side walls of said base having inner radially extending stop means at a place rear to the lower rim just beyond said tailing edge of said base; and a support arranged at rear portion of said base having a longitudinal length complementary to that constituting the difference between that of said base and said lid, a leading edge thereof overlapping said tailing edge of said base and being restricted under said stop means, a vertical upwardly extending lug at each lateral rear end that freely and pivotally engages with said lid at the respective lower corner at the corresponding rear end of said lid, and a snap notch at a suitable location along the lateral rim of at least one of both sides for cooperation with said stop means.

The aforementioned and other objects, features and advantages will be more clearly understood from the following description with reference to the embodiment as illustrated in the accompanying drawing.

FIG. 3 is a perspective view of the library case for the diskettes as shown in FIG. 2 in open position; the closed position as shown in FIG. 2 is depicted in phantom.

Figure 1:
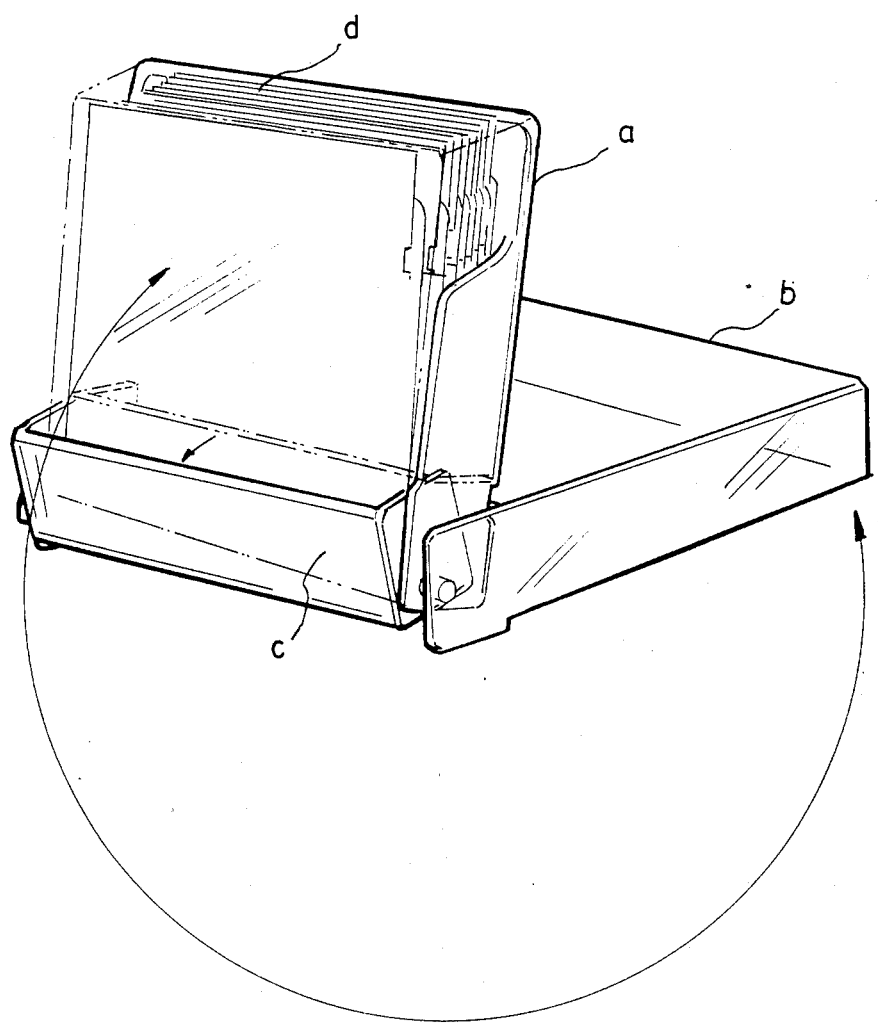
FIG. 1 is a perspective view of the conventional type of the library case for the diskettes in the prior art.
Figure 2:
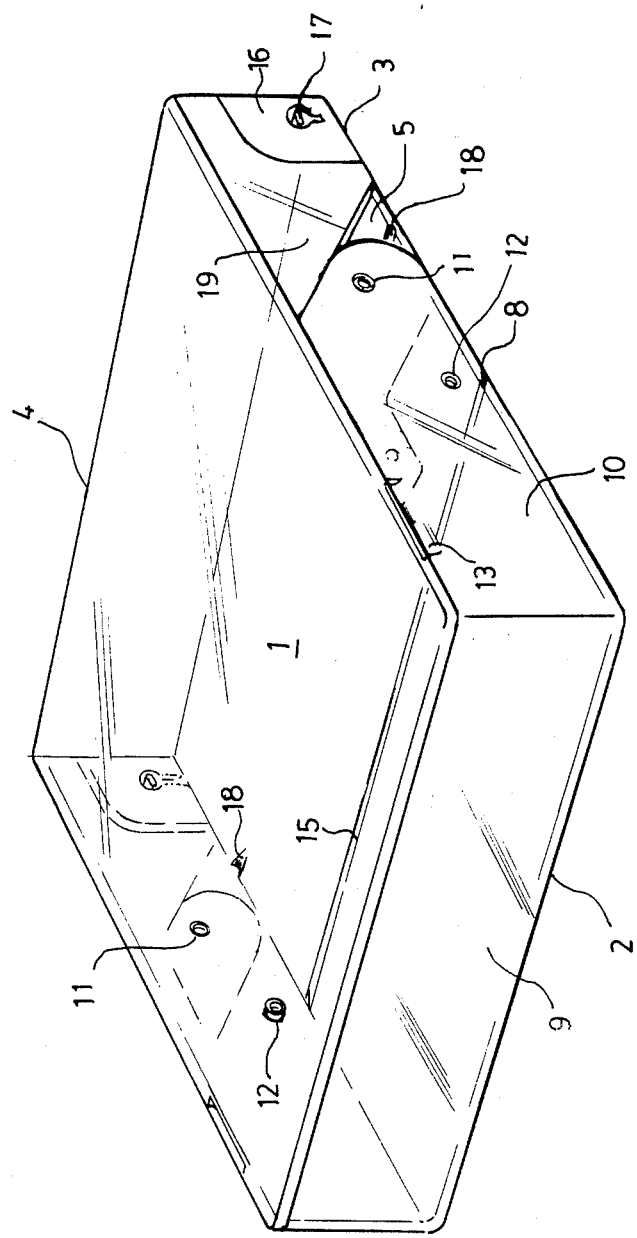
FIG. 2 is a perspective view of the library case for the diskettes in one embodiment according to the present invention in closed position.

According to FIGS. 2 and 3, the library case for the diskettes according the present invention has a substantially rectangular configuration and comprises a lid 1, a base 2 and a support 3. The lid 1 has rear wall 4 and two lateral side walls 5, all vertically extending downwards forwardly from the lid 1. Both side walls 5 extend from rear end of the lid 1 approximately half the distance to the front edge 1' of lid 1. Wall extension 6 at the edge of said side wall 5 abuts the lid 1 and is formed with a raised protrusion 7 on its outer surface.

The base 2 has a base panel 20 having a depth dimension that is slightly less than half the length of lid 1, between front edge 1' and rear wall 4, with the rear extent of panel 20 being defined by a rear edge 8. The base 2 has a front wall 9 and two lateral side walls 10, all vertically extending upwardly from base 2. Side walls 10 are parallel to side walls 5 of the lid 1 and front wall 9 is parallel to rear wall 4 when the case is in the closed condition of FIG. 2. Side walls 10 extend rearwardly beyond said base 2 and have free rounded ends pivotally connected at pivotal connection 11 to side walls 5 of lid 1. An inwardly extending stop means 12 is provided at any one or both of side walls 10 just beyond the rear edge 8 of said base 2. The upper edges of both side walls 10 near the front wall 9 are of reduced thickness to form recesses 13 which facilitate hand manipulation to push up the lid 1 from the closed position. A recess 14 dimensioned to receive the raised protrusion 7 is provided in the inner surface of side wall 10. Of course, a reverse positioning of recess 14 and protrusion 7 could also be employed.

The support 3 is disposed rearwardly of the base 2, when the case is in its open position of FIG. 3, and has a longitudinal length approximately equal the length of base 2 between side walls 10. As used herein, the terms longitudinal and longitudinally mean in the side to side direction perpendicular to side walls 10. Support 3 also has a depth dimension that is complementary to the depth dimension of base panel 20 of base 2 such that when the library case is closed as in FIG. 2, the sum of the depth dimensions of base 2 and support 3 is approximately equal to the length of lid 1 between front edge 1' and rear wall 4. The leading edge 15 of the support 3 appropriately overlaps the rear edge 8 of the base 2. Both said leading edge 15 and rear edge 8 at the portion of overlapping are preferably complementary inclined, so as to make said portion of overlapping have a thickness equivalent to that of the base 2 and the support 3. The leading edge 15 of the support 3 is restricted under the stop means 12 on at least one of the lateral side walls 10 of the base 2, as illustrated in FIG. 2 at closed position. The support 3 lacks a rear wall, but has vertically upwardly extending lugs 16 at the rear ends of both sides of said support that are freely and pivotally engaged at the lower corner of the corresponding lateral side walls 5 of the lid 1 by means of conventional fastening means 17. Outside lateral side wall 5 of the lid 1 in the area between said lug 16 and the end of the lateral side wall 10 of the base 2 is a panel 19 to make a neat appearance. The support 3 is formed with a smooth concave snap notch 18 at a suitable location on at least one lateral rim 22 of support 3.

A plurality of diskettes (not shown) is contained in the present library case. When this case is opened from the closed position as shown in FIG. 2, the lid 1 is pushed up from the base 2 by fingers acting on the recesses 13 at both sides, then the lid 1 is lifted up as illustrated by the double head arrow A of FIG. 3. Meanwhile, the rear wall 4 of the lid 1 is turned forwards as illustrated by the arrow B, and the base 2 is tilted inclinedly rearwardly and upwardly, as illustrated by the arrow C, due to the pivotal connection 11 between lateral side walls 10 and lateral side walls 5 of the lid 1. At the same time, the support 3 is pushed upwards by the rear edge 8 of the base, as illustrated by the arrow D, until the stop means 12 on at least one lateral side of the base 2 is retained into the corresponding notch 18 on the support 3. In this position, the rear edge of the lid 1, the rear edge of the support 3, and the front edge of the base 2 form three supporting lines to make the whole case with the diskettes contained therein stably placed on any supporting surface in the open position as shown in FIG. 3.

In this operation for opening the library case for the diskettes according the present invention, the path of the movement for the lid 1 with repect to the base is relative short, in the range of 90° to 120°, and the support 3 is synchronously moved through an angle of about 45° with respect to the lid 1. Aforementioned degrees are optimal for accessing the diskettes contained in the case but can be optionally varied as desired and not critically defined herewith.

In operation for closing the present case, one only needs to exert a slight downward pressure on the support 3 to move notch 18 out of engagement with the stop means 12, then the lid 1 may be angularly moved towards the base 2 to the closed state as shown in phantom and also as shown in FIG. 2.

While the preferred embodiment has been described, it will be apparent to those skilled in the art that various changes, modifications and variations can be made without departing from the spirit and scope as defined in the accompanying claims.

What is claimed is:

1. A library case, which comprises:

a lid having a rear side and a pair of parallel lateral sides, and downwardly extending walls at its rear side and lateral sides;

a base having a front side, two parallel lateral sides, a base panel with a depth dimension slightly less than half the length of said lid, a rear edge, and upwardly extending walls at the front side and both lateral sides of said base, said lateral side walls of said base being longer than said base panel, and means pivotally connecting outer ends of said lateral side walls of said base to said lateral side walls of said lid, at least one of said lateral side walls of said base having inner radially extending stop means; and a support positioned rearwardly of said base, said support having a depth dimension complementary to the depth dimension of said base panel so that the sum of said depth dimensions is approximately equal to the length of said lid, and having a leading edge overlapping said rear edge of said base and being restricted under said stop means, a vertical upwardly extending lug at each lateral rear end that freely and pivotally engages with said lid, and a snap notch along at least one lateral rim of at least one of said ends for cooperation with said stop means.

2. The library case of claim 1, additionally including manually engageable recesses in outer surfaces of said lateral side walls of said base.

3. The library case of claim 1, additionally including extension portions formed at the outer edges of both of said lateral side walls of said lid and abutting said lid.

4. The library case of claim 3 additionally including a protrusion on one of said extension portions on said lateral side walls and a recess on the other of said extension portion on said lateral side walls, said recess and said protrusion being matingly engageable for detachably holding said lid and said base in closed relationship.

5. The library case of claim 1, wherein said stop means is located on at least one of said lateral side walls just beyond said rear edge of said base.

6. The library case of claim 1, wherein said lug engages with said lid at the lower corner of said corresponding lateral side walls of said lid.

7. The library case of claim 6, wherein said lug engages said lid by fastening means.

8. The library case of claim 1, wherein said leading edge and said rear edge at the point of overlap are complementarily inclined for a thickness approximately equivalent to the thickness of said base and said support.

* * * * *